Patented May 17, 1932

1,858,317

UNITED STATES PATENT OFFICE

PAUL G. WILLETTS, OF WEST HARTFORD, CONNECTICUT, ASSIGNOR TO HARTFORD-EMPIRE COMPANY, OF HARTFORD, CONNECTICUT, A CORPORATION OF DELAWARE

REFRACTORY FOR CONTACT WITH MOLTEN GLASS

No Drawing. Application filed August 25, 1928. Serial No. 302,151.

My invention relates to refractories for contact with molten glass, such as tank blocks for glass furnaces, blocks and other parts for glass feeders, and implements for use in molten glass, and its object is to provide articles of this character which shall have materially longer life in service than the refractories which have heretofore been used for these purposes, which shall have such composition that, when dissolved in molten glass in service, it will not greatly distort the composition of the glass, and which shall have a fine-grained internal structure, low porosity and low flux content and may be made at commercially obtainable temperatures and from cheap materials.

I have discovered by experiments and test, some of which are outlined below, that the effective life of a refractory in contact with molten glass is a function of several properties, particularly the porosity of the material, which controls its permeability to molten glass, and the quantity of iron and alkaline fluxes it contains, and that the life of such refractories does not solely, or even largely, depend upon the proportions of their principal chemical constituents, such as silica and alumina.

I have found that the life of glass tank blocks, for example, composed of clays and other silicious and aluminous materials, does not seem to be particularly affected by the presence of alkaline earth oxids or titanium oxid, and that those substances, when in the small proportions in which they occur as impurities in the clays and other materials which I employ, may be disregarded; but that the presence of iron and alkalies has a decided effect upon the life of refractories in contact with glass, so much so that the life of such a refractory, other things being equal, is a direct function of the amount of iron and alkali metal oxids present therein. In particular, I have discovered that the life of such refractories may be largely increased if the content of iron and alkali metal oxids is reduced below 1½%, and I have prepared such blocks at low cost by the use of certain materials which are abundant and cheap.

The present application is directed to the production of a specific type of refractory falling under the class described above, namely the class of refractories having high density and low content of iron and alkaline fluxes, and consequently having long life in contact with molten glass.

This specific refractory is known as No. 493 and is made from a batch mixture which may consist of about 7 parts of washed Georgia Klondike white kaolin and 3 parts of finely divided potter's flint. The composition of these two ingredients is indicated in the following table which gives analyses of typical samples:

| | Georgia Klondike white kaolin (ignited) | Potter's flint |
|---|---|---|
| $Al_2O_3$ | 45.35 | 0.32 |
| $SiO_2$ | 52.30 | 99.35 |
| $TiO_2$ | 1.86 | ---- |
| $Fe_2O_3$ | 0.50 | 0.03 |
| CaO | Trace | 0.10 |
| MgO | | |
| $Na_2O$ | 0.07 | ---- |
| Loss on ignition | | 0.20 |
| | 100.08 | 100.00 |

These ingredients are mixed in the raw state. A grog is first prepared by mixing about 7 parts of Georgia Klondike kaolin and 3 parts of potter's flint, both ingredients being first reduced to a state of impalpable fineness, suitably fine enough to pass through a standard 325-mesh screen. If desired, the potter's flint may be employed in a state in which it is readily obtained commercially, in which practically all passes through a 100-mesh screen and all but 7% passes through a 300-mesh screen. These ingredients are mixed as thoroughly as possible in the presence of water, by plunging, pugging or other approved methods, so as to produce intimate association of the ingredients. Since it is important that the iron content of the final product be kept as low as possible, and since the flint has a pronounced abrasive effect upon metal surfaces, it is desirable that the materials be ground and mixed in apparatus having non-metallic surfaces. Thus, a rubber-lined mill and flint pebbles, in lieu of metal balls, may be used for grinding the kaolin or the flint, or both, and the materials may be mixed in a porcelain-lined pug mill. The mixed material is formed into pieces suitable for handling, which are dried and are calcined at a temperature of about 2850° F.

The calcined grog material is broken down to suitable fineness to serve as grog. Thus the material may be ground fine enough to pass through a 24-mesh screen, although the sizes of the grog particles may be somewhat larger or smaller than this size. A binding mixture is made from about 7 parts of the raw Georgia Klondike kaolin and 3 parts of the potter's flint, as in the preparation of the grog material. However, the ingredients for the binder are preferably mixed with each other, and with the grog, without the addition of as much water as is used in preparing the grog material, only enough water being added at this stage for dry pressing. 6% or 7% of water is sufficient for this purpose. The grog and the binder are mixed in suitable proportions, for example, 60 parts of the grog and 40 parts of the binder. The mixture thus made is formed into blocks or other shapes desired, which are preferably dry-pressed under a pressure of the order of two tons per square inch or higher.

The blocks or other articles are then dried and fired at a temperature of about 2850° F. The proper firing temperature for the grog and for the final articles depends somewhat upon the degree of purity of the starting materials. The purer the starting materials, the higher the temperature that is necessary to mature the products. Thus, if the starting materials contain only 1% of ingredients other than silica and alumina, instead of 1.73% as in the above specific example, a firing temperature of about 2900° F. would be required.

The composition of a typical finished block, prepared according to the process described above is as follows:

| | |
|---|---|
| Loss on ignition | .18% |
| $SiO_2$ | 75.45 |
| $Al_2O_3$ | 23.51 |
| $Fe_2O_3$ | .38 |
| $TiO_2$ | .99 |
| CaO | .04 |
| MgO | .14 |
| Alkalies | .00 |
| | 100.69 |

The blocks of the above analysis have an apparent porosity of .10% a bulk specific gravity of 2.240 and a true specific gravity of 2.465. The porosity is particularly significant, since ordinary tank blocks have a porosity of over 12%. The low content of iron and alkalies also contributes to the long life of these blocks and should be compared with an iron and alkali metal content of 2.75% in ordinary glass tank blocks. The blocks of the present invention have a life in contact with molten glass several times that of ordinary tank blocks. This is indicated by tests made by immersing cubes of the test materials in molten glass maintained at constant temperature, and observing the number of hours which elapse before the sample entirely disappears in solution. This test, when applied at a temperature of 2550° F. to the "No. 493" material described herein, to samples of cast mullite refractories and to samples of good commercial glass tank blocks of ordinary manufacture, gives the following results:

| | Hours of life |
|---|---|
| "No. 493" | 74 |
| Cast block | 50 |
| Ordinary good tank block | 16 |

In the present specification and in some of the claims, the starting materials are referred to as Georgia Klondike kaolin and potter's flint. It will be understood that these designations include such other materials as resemble these particular substances in respect to their analytical composition and their behavior when used in the process described herein.

The blocks described herein have a largely amorphous internal structure with a small amount of crystalline aluminum silicate crystals of small size. Such structure is produced in the blocks by the conversion of the crystalline silicious ingredients of the grog and the binder into amorphous silica hence, the amorphous structure derived from the binder is produced in situ when the blocks are fired. These products therefore differ radically from the numerous glass-engaging refractories which have been prepared in recent years upon the theory that the presence of large quantities of crystals of mullite or corundum is required or desirable in order that the products may have long life in contact with molten glass. Some crystals of mullite are always produced when substances containing silica and alumina are heated sufficiently and this is true in the products of the present invention. It is not possible to produce a product consisting solely of crystalline material, and the impurities necessarily present in commercial starting materials all become concentrated in the matrix which unites the crystals together so that an essentially crystalline refractory is only as good in service as the binder which unites the crystals. Recognizing this, the present invention aims to produce a refractory material of long life in the form of an essentially amorphous body with low amounts of crystals and flux, both evenly distributed in the material. The starting materials herein referred to lend themselves well to this purpose since they are both low in iron and alkaline fluxes.

I claim as my invention:

1. A batch mixture for a ceramic refractory comprising homogeneous granular grog containing the derivatives of 30% silica and 70% Georgia Klondike koalin fired to high temperature and having substantially the same physical and chemical characteristics as the refractory to be produced, and a raw binding material for the grog composed of approximately 30% silica and 70% Georgia Klondike kaolin, both of sufficient fineness to pass a screen of the order of a 325 mesh screen.

2. The process of making refractories which comprises grinding silica and Georgia Klondike kaolin to such fineness that substantially all of both of them will pass through a screen of the order of a 325 mesh screen, intimately mixing the silica and kaolin, firing the mixture to a temperature of the order of 2850° F., crushing the fired material to form grog having substantially the same physical and chemical characteristics as the finished body, mixing the grog with a raw binder of the same composition of ingredients and of the same fineness as the raw mixture for the grog, to form a final assembly, and firing the final assembly to about 2850° F.

Signed at Hartford, Connecticut this 24th day of August, 1928.

PAUL G. WILLETTS.